(12) United States Patent
Carruth et al.

(10) Patent No.: US 9,130,801 B1
(45) Date of Patent: Sep. 8, 2015

(54) PUSHED-BASED PACKAGE DISTRIBUTION

(75) Inventors: Chandler Carruth, San Jose, CA (US); Jonathan Perkins, Mountain View, CA (US)

(73) Assignee: Google Inc., Mountain View, CA (US)

( * ) Notice: Subject to any disclaimer, the term of this patent is extended or adjusted under 35 U.S.C. 154(b) by 570 days.

(21) Appl. No.: 12/951,961

(22) Filed: Nov. 22, 2010

(51) Int. Cl.
*H04L 29/08* (2006.01)
*H04L 29/06* (2006.01)
*H04L 12/24* (2006.01)

(52) U.S. Cl.
CPC .......... *H04L 29/08072* (2013.01); *H04L 29/06* (2013.01); *H04L 41/0213* (2013.01)

(58) Field of Classification Search
CPC .............. H04L 29/06; H04L 29/08072; H04L 41/0213
USPC .......... 370/242, 244, 245, 248, 249; 709/223, 709/224, 219, 220; 717/170
See application file for complete search history.

(56) References Cited

U.S. PATENT DOCUMENTS

| | | | |
|---|---|---|---|
| 6,996,817 B2* | 2/2006 | Birum et al. ................... | 717/170 |
| 7,555,551 B1* | 6/2009 | McCorkendale et al. .... | 709/225 |
| 2001/0042112 A1* | 11/2001 | Slivka et al. ................... | 709/220 |
| 2004/0034853 A1* | 2/2004 | Gibbons et al. ............... | 717/174 |
| 2004/0215755 A1* | 10/2004 | O'Neill ......................... | 709/223 |

OTHER PUBLICATIONS

"Advanced Packaging Tool," [Online] [Downloaded on Nov. 15, 2010]; Retrieved from the Internet at http://en.wikipedia.org/wiki/Advanced_Packaging_Tool; 7 pages.
"Windows Update: Overview," [Online] [Downloaded on Nov. 15, 2010]; Retrieved from the Internet at www.microsoft.com/windows/downloads/windowsupdate/overview.mspx; 2 pages.

* cited by examiner

*Primary Examiner* — Kwang B Yao
*Assistant Examiner* — Hien Nguyen
(74) *Attorney, Agent, or Firm* — Fish & Richardson P.C.

(57) ABSTRACT

Methods, systems, and apparatus, including computer programs encoded on a computer storage medium, for pushed-based package distribution. In one aspect, a method combines accepting a plurality of persistent connections in which each connection is initiated by a different client, determining a version of a package for each of the clients, and distributing the package version to the clients.

19 Claims, 8 Drawing Sheets

PUSHED-BASED PACKAGE DISTRIBUTION

BACKGROUND

This specification relates to digital data processing and, in particular, to techniques for updating packages.

Software distribution tools provide graphical user interfaces that allow users to install and remove software packages from their computing systems. Some of these tools utilize lower-level software libraries for performing basic tasks such as determining whether newer versions of a software package are available, fetching newer versions of software packages, removing older versions of software packages, and installing software packages. Other software distribution tools that execute on client devices can periodically check to see if newer versions of a software package are available on server systems and, if so, prompt users to download and install the new version.

SUMMARY

In general, one innovative aspect of the subject matter described in this specification can be embodied in methods that include the actions of: accepting a plurality of persistent connections in which each connection is initiated by a different client; receiving from each of the connections a separate request describing a current software configuration for the respective client; determining based at least partially on the received requests that a first non-empty subset of the clients are to receive a first version of a package and responding to each client in the first subset on their respective connections with information describing the first version of the package, in which the first version of the package is designated as a non-test version of the package; determining that a second non-empty subset of the clients are to receive a different second version of the package based at least partially on a property associated with the package, and responding to each client in the second subset on their respective connections with information describing the second version of the package, in which the second version of the package is designated as a test version of the package; and in which the first subset of the clients does not intersect with the second subset of the clients. Other embodiments of this aspect include corresponding systems, apparatus, and computer programs, configured to perform the actions of the methods, encoded on computer storage devices.

These and other embodiments can each optionally include one or more of the following features. A persistent connection for a client in the first subset of the clients can be maintained if the first version of the package fails to install properly on the client. Each persistent connection in the plurality of persistent connections can provide a reliable, ordered delivery of a stream of bytes to and from the persistent connection's respective client. Each persistent connection in the plurality of persistent connections is a transmission control protocol (TCP) connection. A keep-alive message can be received from each persistent connection in the plurality of persistent connections at various times. Responding to each client in the first subset can include determining a time frame to respond to the particular client based on one or more of: a geographic region associated with the particular client, a time zone of the particular client, an operating system of the particular client, an architecture of the particular client, a configuration of the particular client, or a track associated with the non-test version of the package; and responding to the particular client with information regarding the particular version of the package during the determined time frame. Responding to each client in the first subset of the clients further can comprise sending validation data for the first version of the package to the particular client. The validation data can include a checksum of the first version of the package and one or more of: a nonce and a date. The validation data can be signed before sending the validation data to the particular client.

Particular embodiments of the subject matter described in this specification can be implemented so as to realize one or more of the following advantages. One or more implementations allow distribution of packages to machines that is rapid and supports a variety of use-cases. Package fixes can be distributed promptly in cases were a software bug is discovered that needs to be neutralized quickly. So-called canary releases can be distributed to a percentage of machines to minimize the impact of a problematic release. The distribution of packages can be limited to certain regions of the world or certain hours of the day. Selection of package versions can be performed by the version server which reduces the complexity of client-side daemons.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In various implementations, push-based distribution of packages to a group of data processing apparatuses (e.g., personal computers, tablet computers, smart phones, servers, and so on), referred to as clients, is described. A package is a collection of one or more components such as binary or non-binary software executables, software libraries, configuration files, text files, source code files, multimedia content, data, or combinations of these, that an administrator may want to distribute to clients in a consistent fashion. For example, a package might include a new or updated version of a software application such as a word processor or a component of the application. By way of a further example, a package could hold a digital version of a feature film or an electronic book. In some implementations, a package is associated with one or more attributes that indicate which type of client the package is for (e.g., a specific computer or smart phone model), a hardware configuration (e.g., a microprocessor architecture, available memory and disk space), an operating system version, a configuration of external devices that are coupled to the client (e.g., cameras, microphones, speakers, and so on), and a location of the client. Other attributes are possible.

Figure 1A:
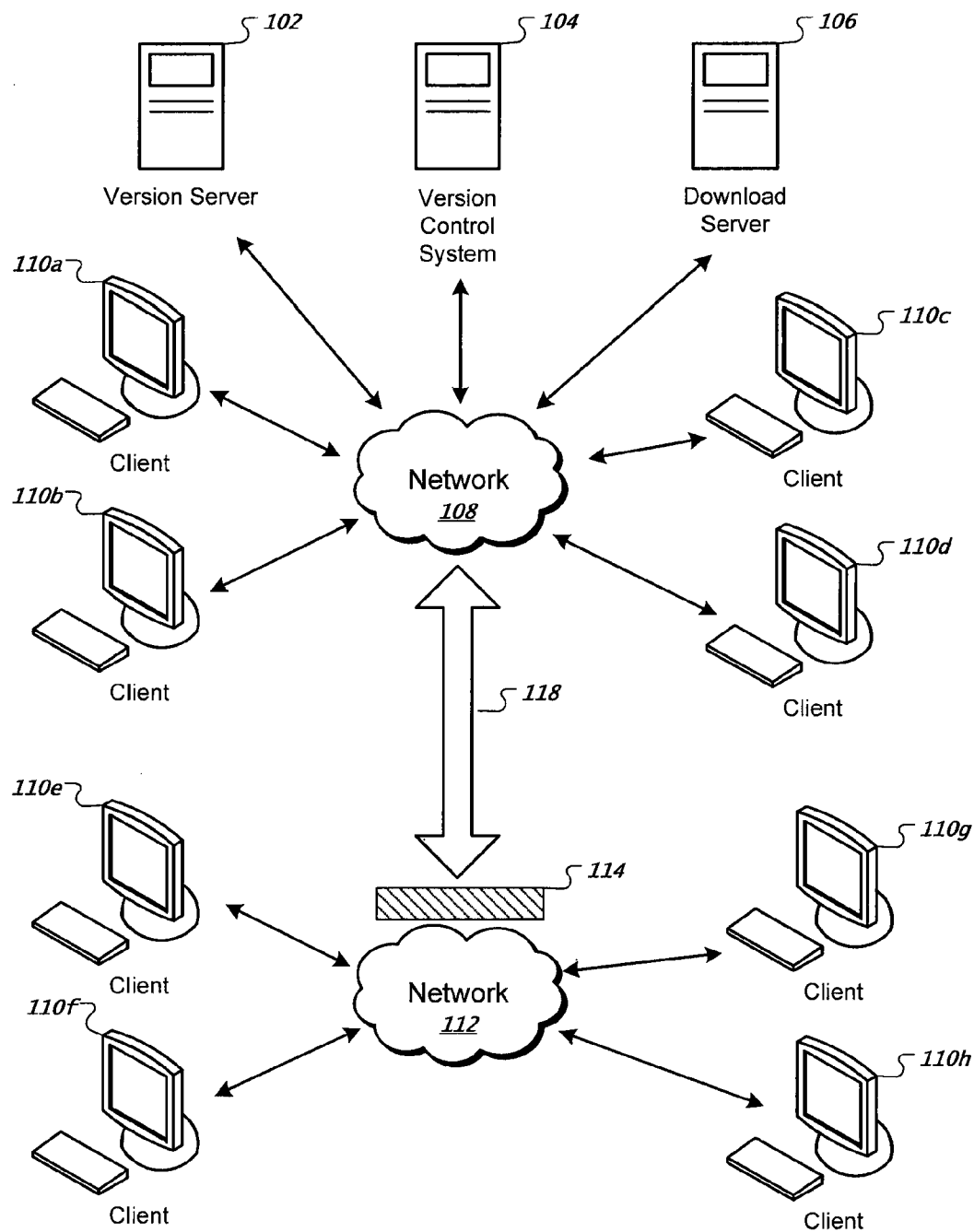
FIG. 1A illustrates example computer networks including clients, a version server, a version control system, and a download server.

FIG. 1A illustrates example computer networks 108 and 112. A network is one or more public or private wired or wireless networks (e.g., the Internet) through which computing devices such as clients 110a-h and servers 102, 104 and 106 can communicate with each other. A network can be local area network or a wide area network, for example. Network 108 enables communication between clients 110a-d, a version server 102, a version control system 104, and a download server 106. Network 112 enables communication between clients 110e-h and also includes a firewall 114. The networks 108 and 112 are connected by a bridge 118 (or by other networks) that allow clients and servers on either network to communicate with each other.

The version control system 104 includes one or more data processing apparatuses (e.g., servers) and includes software that executes on the data processing apparatuses and maintains versions of packages and their constituent components. The version control system 104 controls the management of changes to files that make up the components of packages. The version control system 104 can be used in software development by a team of people, for example, to keep track of each file's change history, to prevent files from being simultaneously changed by team members, and to create package versions. A package version is a collection of files as they existed at a given point in time. In some implementations, a package version is given a version designation (e.g., a number code, letter code, or combination thereof) by the version control system 104 that can be used to differentiate between older and newer versions of a package. For example, a newer version of a package that fixes a bug in an earlier version of the package would be given a different version designation, such as "1.2.1", than the earlier version of the package which, for example, would have a version of "1.2". In some implementations, another storage system may be used to store packages instead of the version control system 104.

A version server 102 includes one or more data processing apparatuses (e.g., servers) and software that executes on the data processing apparatuses and pushes out information regarding available package updates to clients. Each client 110 includes a daemon which is a software-implemented process for obtaining and installing packages on the particular client 110. The daemons can communicate with one or more version and download servers (e.g., version server 102 and download server 106). In some implementations, there are a large number of clients (e.g., a thousand or more) and a small number of version and download servers (e.g., ten or fewer). When a daemon commences execution, it opens a persistent connection with a version server. For example, the daemon executing on client 110e opens a persistent connection with the version server 102. Alternatively, a daemon can notify a version server 102 of its network location and then the version server 102 can initiate a persistent connection to that location. In yet further implementations, the version server 102 can access an inventory of executing daemons and initiate persistent connections with daemons included in the inventory. The persistent connection is able to maintain connectivity through one or more firewalls (e.g., firewall 114) in some implementations.

In some implementations, the persistent connection provides a reliable bi-directional ordered delivery of a stream of bytes communicated between the client 110d and the version server 102. Reliable delivery of a stream of bytes ensures through acknowledgements and/or error detection codes, for example, that the stream of bytes is received by the intended recipient despite any potential errors that might arise in the communication. In further implementations, the persistent connection is a transmission control protocol (TCP) connection. Other types of persistent connections are possible. In yet further implementations, the persistent connection can be used to communicate encrypted information such as through use of Transport Layer Security (TLS) on top of the persistent connection. The daemon can at times send a so-called "keep-alive" message to the version server 102 so that the version server 102 knows that the client 110d is still operable. The version server 102 can drop persistent connections that have gone silent for a threshold period of time (e.g., thirty minutes), for example.

The daemon transmits information to version server 102 over the persistent connection including a list of the package versions (if any) that are currently installed on its client (e.g., client 110a). After the version server 102 receives the list of packages, the version server 102 accesses a configuration database to obtain a configuration for the client 110a. The configuration details the package versions that should be installed on the client 110a. An organization's system administrator, for instance, can maintain the configuration database and create configurations for client computers that differ according to the software needs of respective departments within the organization or by geographic region. Alternatively, or in addition, an automatic process can maintain configurations for client computers based on attributes of the clients. For example, a client can be assigned package versions that have associated attributes that match the client's.

If the client 110a's configuration includes package versions that are not in the list of package versions received by the version server 102 from the daemon, the version server 102 transmits information to the client 110 describing the package versions that are missing from the client 110a. These missing packages can be newer versions of packages already installed on the client 110a or entirely new packages. After the client 110a receives the information from the version server 102, the client 110a can contact a download server (e.g., download server 106) in order to receive the needed package versions. In further implementations, the version server 102 can send a request to the client 110a over the persistent connection that describes package versions currently installed on the client 110a which should be removed, such as package versions that are not included in the configuration for the client 110a, for example. In these implementations, the client 110's daemon can remove the designated package version in response to the request.

In some implementations, a package version can be designated with a track to indicate whether the version is stable, unstable, or is for testing. Other tracks are possible. A stable package version is considered to have been tested and is reliable. For example, a stable package version for a word processing software application is one that is not likely to malfunction during its operation. An unstable package version is one that may malfunction during its operation. A test package version is one that is for testing purposes and may also malfunction during its operation. A system administrator can assign client configurations different tracks of the same package version for purposes of testing and data collection. For example, a small percentage of client configurations in an organization's department can include a testing track of a package version while the remaining client configurations in the department include the stable track.

Figure 1B:
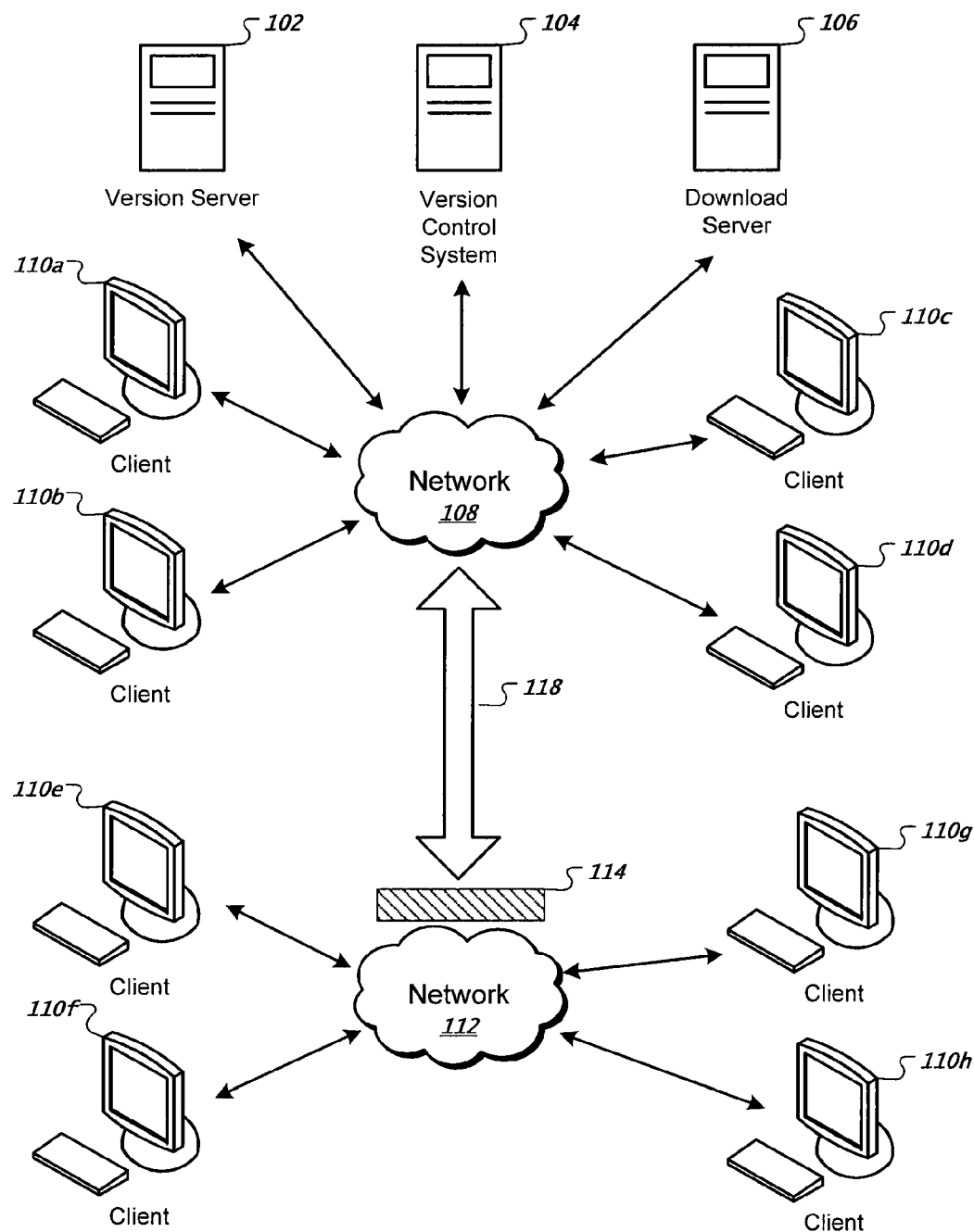
FIG. 1B illustrates a subset of clients which will not receive a stable version of a package.

Alternatively, client configurations can be assigned tracks of a package version in an automated fashion. A percentage or number clients can be selected automatically to receive testing or unstable tracks of a package version based on random selection of the clients or round-robin selection of the clients, for instance. As illustrated in FIG. 1B, clients 110b, 110c and 110f have been selected by the version server 102 to receive a non-stable track of a package version. A client can also be selected to receive testing or unstable tracks based on the time since the client last received a testing or unstable track, the total number of unstable or testing tracks that are currently installed on the client, attributes of the client such as the client's hardware configuration or operating system, or combinations of these. Other ways of selecting clients are possible.

Figure 2A:
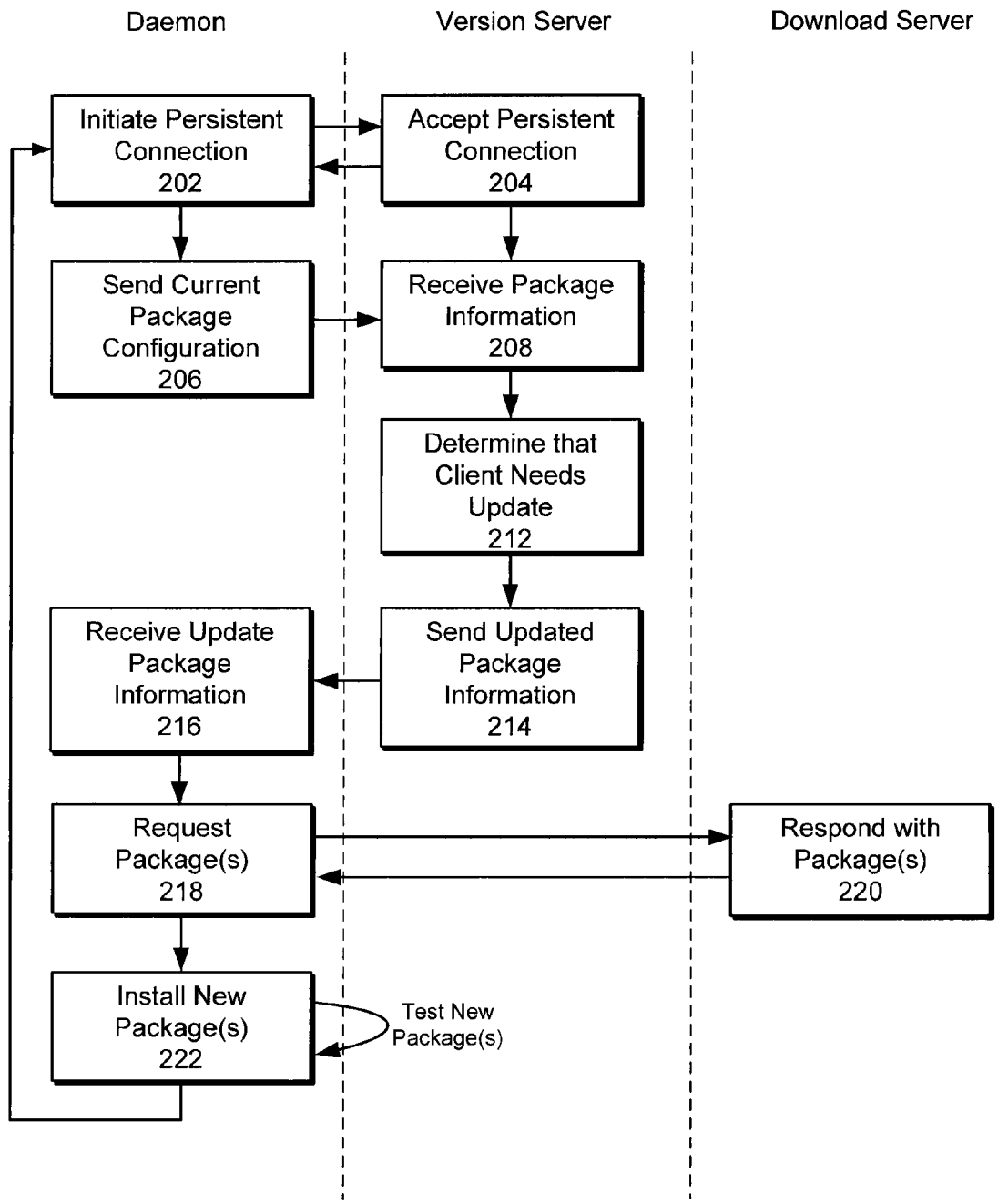
FIG. 2A is a flow chart illustrating example interactions between a daemon, a version server and a download server for pushing a package to a client.

FIG. 2A is a flow chart illustrating example interactions between a daemon, a version server and a download server for pushing a package to a client. In this chart, time flows in a direction from the top of the drawing to the bottom. To begin with, a daemon executing on a client (e.g., client 110a) initiates a persistent connection with a version server (e.g., version server 102; block 202). By way of illustration, the persistent connection can be a TCP/IP connection. The version server then accepts the persistent connection (block 204). (Alternatively, the version server can initiate the persistent connection with the daemon.) At a later time, the daemon transmits a request over the persistent connection to the version server that includes a list of the package versions (if any) that are currently installed on its client (block 206). (Alternatively, the version server can request from the daemon the list of package versions that are currently installed on the daemon's client.) In some implementations the request includes a nonce and/or a date stamp which can be used later by the version server to construct replies to the daemon. The version server receives this request (block 208) and compares the list to a package configuration for the daemon's client and determines which package versions are missing from the client (block 212). As described above, the package configuration for the daemon's client can be prescribed by a system administrator or determined automatically based on attributes of the client, for instance.

At some later time, the version server sends package information to the daemon (block 214) which includes information regarding each package that the daemon needs to install on its client. (If the version server determines that there are currently no needed package versions on the client, the version server can wait to respond to the client at time when package versions become available that would be needed by the client.) The daemon then receives the package information (block 216). The package information includes, for each package, the name of the package and the version of the package and, optionally, a track designation. The package information sent by the version server to the daemon can be digitally signed (e.g., using public key cryptography). By way of illustration, the package information can be signed by the version server using the public key that is associated with the daemon's client. The signed package information can also include a nonce and/or a date stamp that was received from the daemon. The daemon can then verify the signature using its private key. In addition, a checksum can be included in the package information for each package to be installed on the client. The checksum can be computed over all of a package's components, for example. The daemon can verify the authenticity of a downloaded package by calculating the checksum of the downloaded package and comparing it to the checksum received in the package information to ensure that the checksums match. Finally, a daemon can refuse to download a package that has an earlier version of the currently installed package.

Next, the daemon requests packages specified in the package information from a download server (e.g., download server 106; block 218). The request to the download server can include the identification of one or more of the packages specified in the package information received from the version server. The download server receives the request and responds with the needed packages (block 220). The daemon can request packages from more than one download server either in a serial or a parallel fashion, for example. In some implementations, the daemon is configured to commence downloading packages immediately after receiving the package information from the version server. In other implementations, the package information received from the version server includes a download time which is a time at which the daemon is to attempt to download packages specified in the package information from a download server. The download time can be based on a time zone in which the daemon's client computing device is located, for example, so that package downloads take place in the middle of the night when the client is not being used or at another time selected by the client. Alternatively, the download time can be based on one or more attributes of the client or the package (e.g., the track of the package). Other ways of determining the download time are possible.

The daemon can ignore the download time and download packages immediately if the daemon detects that the daemon has not previously executed on the client or that the client's installed software is corrupt or non-functioning, for instance. In yet a further implementation, the package information does not include a download time but, instead, the version server sends the package information to the daemon (block 214) at a time when the version server wishes the packages to be downloaded by the daemon. In some implementations, the version server and the download server may be combined such that, rather than having the version server reply with a package version to download, the version server can transmit the entire package to a client.

Once the package or packages are downloaded to the client, the daemon installs the packages on the client (block 222). In some implementations, the packages can include an installation script or program which can be executed by the daemon in order to remove components from the packages and install them on the client. For example, an installation script can decompress a package component and install it in its proper location on a storage device of the client. In further implementations, packages can include a test script or program which can be executed by the daemon (or by an installation script/program) in order to determine whether the package installation was successful. By way of illustration, a test script or program can execute a newly installed package and interact with it in order to determine if the package is running properly. In yet a further implementation, one or more of the downloaded packages can include a new version of the daemon software such that the daemon software will be replaced once the package is installed. If all of the packages install properly, the daemon closes its persistent connection with the version server and initiates a new persistent connection with the version server and the process begins anew (block 202). This may be the result of the daemon causing the client to reboot or restart after the packages have been installed, for example. Alternatively, the daemon can maintain the existing persistent connection.

Figure 2B:
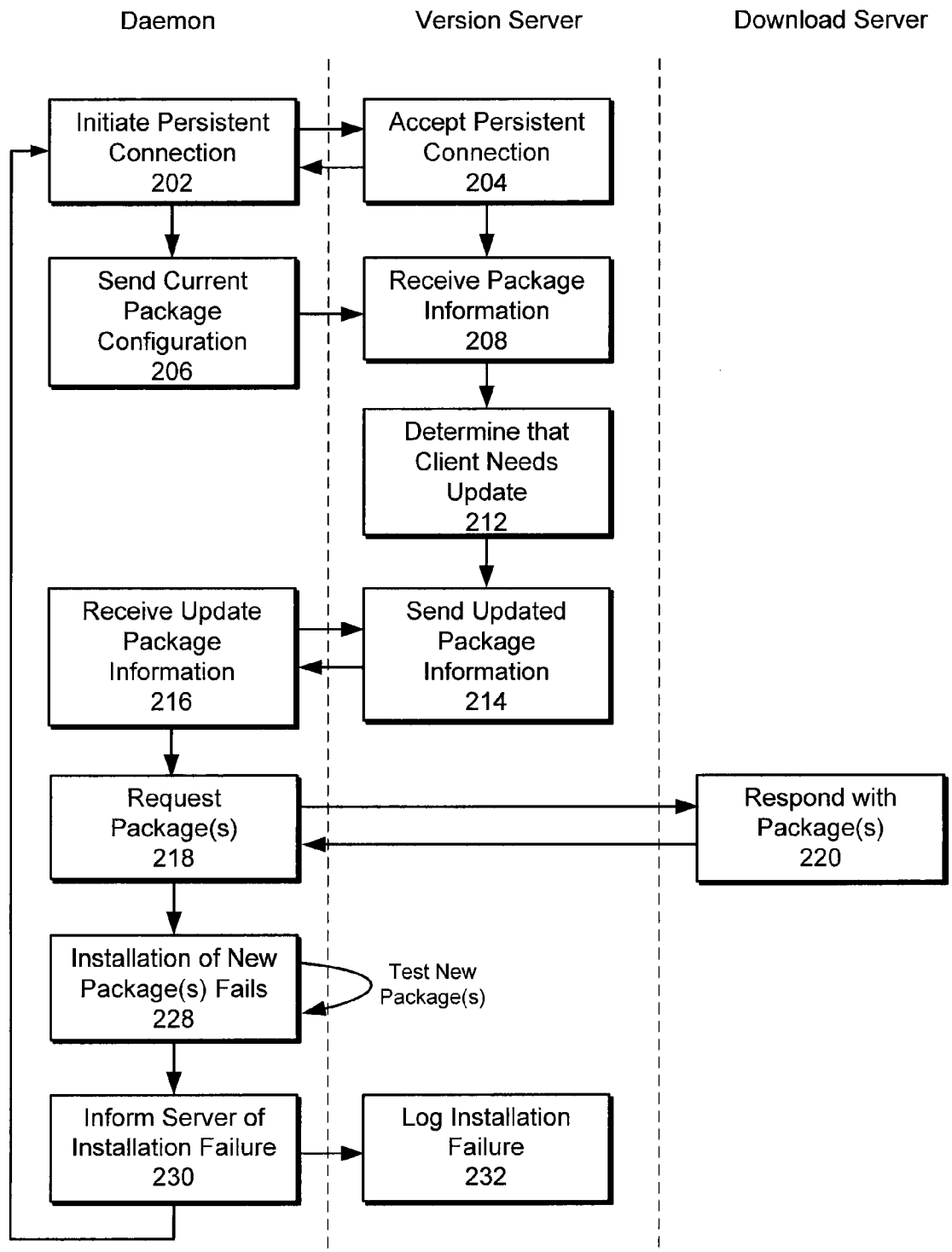
FIG. 2B is a flow chart illustrating example interactions between a daemon, a version server and a download server when package installation fails.

If one or more of the packages do not install properly on the client (e.g., as indicated by the output of a test script or program), the daemon informs the version server of the failure over the existing persistent connection or over a new persistent connection (FIG. 2B, block 230). The version server can log the installation failure (block 232) so that the person(s) responsible for the package(s) that failed to install can be notified. In some implementations the version server can automatically notify the person(s) responsible for a package that failed to install by sending a message (e.g., an electronic mail message, a short message service message, and so on) to them. If a threshold number of daemons (e.g., five) report the installation failure of a particular package, the version server can remove the package from any client configurations that include it to prevent future installation failures. The version server can also inform any daemons that are waiting to download the package not to do so. Alternatively, the daemon can inform the version server of the installation failure when the daemon initiates a new persistent connection with the version server (block 202).

Figure 2C:
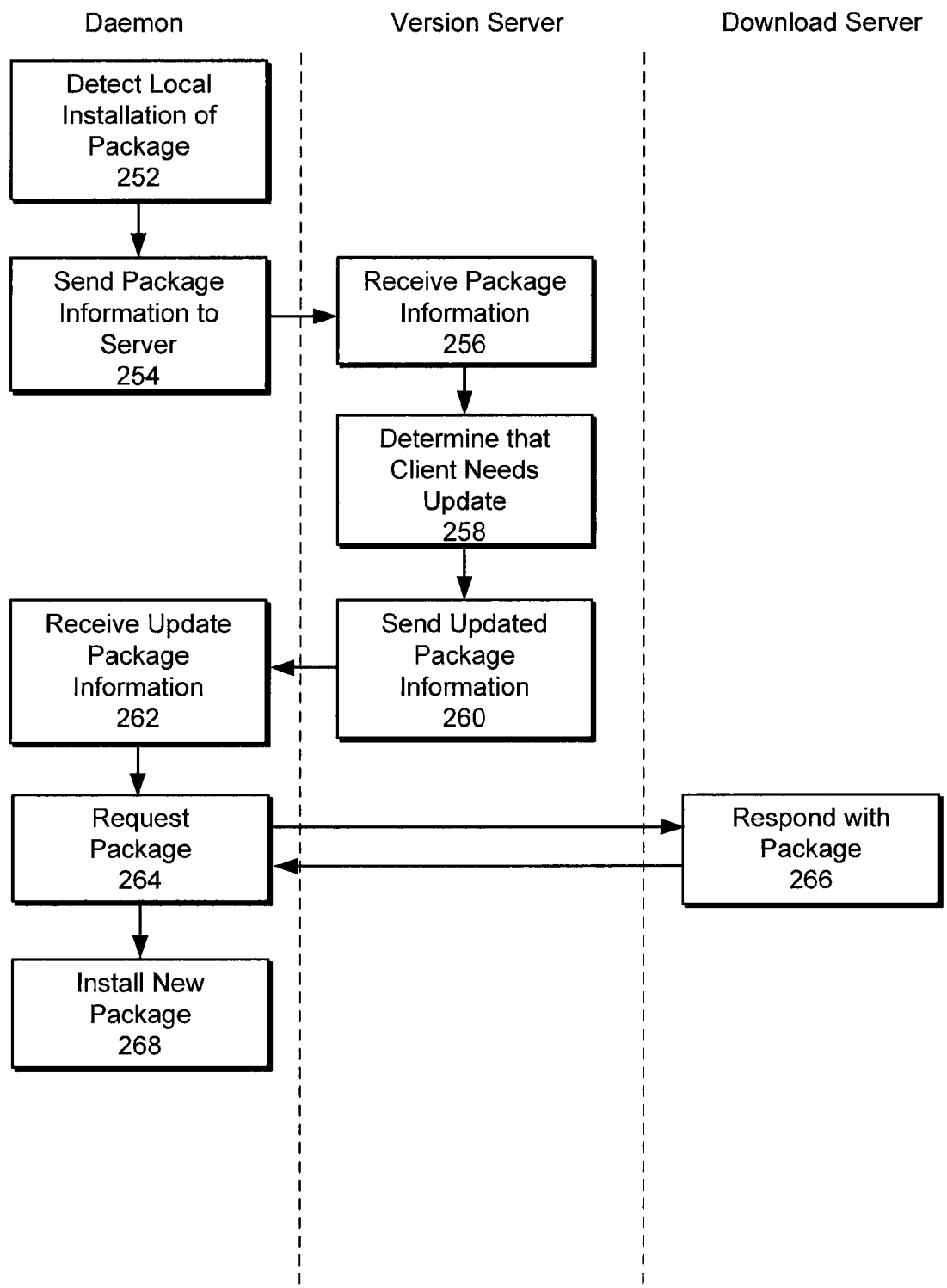
FIG. 2C is a flow chart illustrating example interactions between a daemon, a version server and a download server when the daemon informs the version server that a package has been installed on the client.

FIG. 2C is a flow chart illustrating example interactions between a daemon, a version server and a download server when the daemon informs the version server that a package has been installed on the client. In various implementations, the daemon can detect when packages are installed on its client that were not downloaded from a download server or previously provided to a download server (block 252). For example, the daemon can run a separate process thread which checks at various times whether a local version of a package on the client has changed since the daemon last opened a persistent connection to the version server or if an entirely new package was installed on the client that was not described in package information previously received from the version server. The daemon sends information regarding the detected package(s) to the version server (block 254). The version server receives the package information from the daemon (block 256) and compares the information to the configuration information for the daemon's client. In some implementations, the version server can instruct the daemon to remove any packages from the client that are not part of the client's configuration. In further implementations, the version server can determine whether one or more of the detected packages need to be updated if there is a newer version available for any of the packages (block 258). In this case, the updated package information is sent by the version server (block 260) to the daemon which receives the updated package information (block 262). The daemon can then request any needed packages from one or more version servers (block 264). The download server(s) respond with the needed packages (block 266) and the daemon installs the new packages(s) as described above (block 268).

Figure 2D:
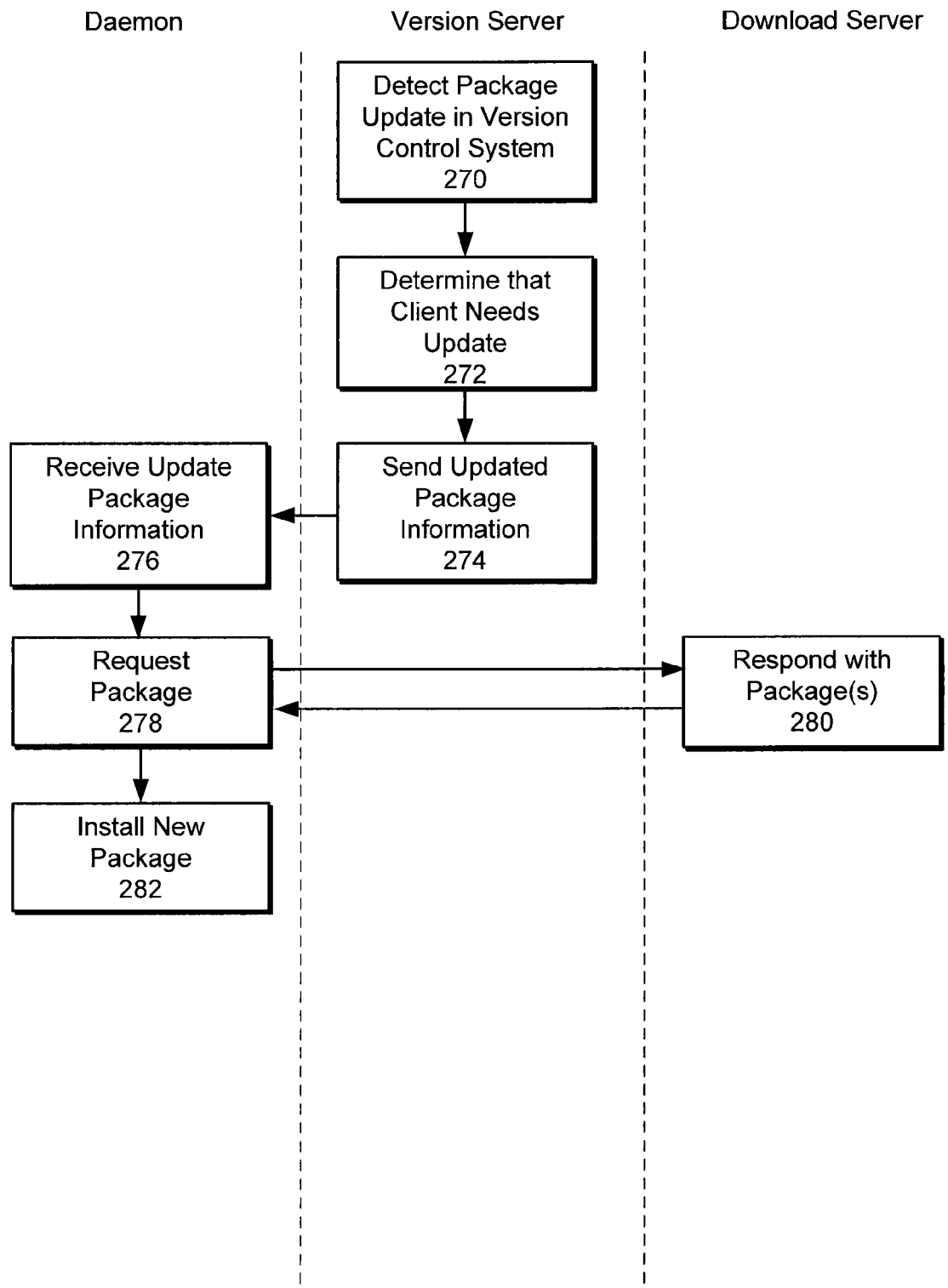
FIG. 2D is a flow chart illustrating example interactions between a daemon, a version server and a download server when the version server becomes aware of a new package on the version control system.

FIG. 2D is a flow chart illustrating example interactions between a daemon, a version server and a download server when the version server becomes aware of a new package on the version control system. In various implementations, the version server can detect when new packages or new versions of packages are available in the version control system (e.g., version control system 104; block 270). For example, the version server can query the version control system at various times to determine if any new package versions are available. Alternatively, the version control system can inform the version server when new package versions are available. If a new package version is available, the version server can examine the client configurations to identify which clients depend on the new package version (block 272). A daemon whose client depends on the new package version can be sent a response with package information for the new package version (block 274). The daemon receives the updated package information (block 276). The daemon can then request the needed package from a download server (block 278). The download server responds with the needed package (block 280) and the daemon installs the package as described above (block 282).

Figure 3:
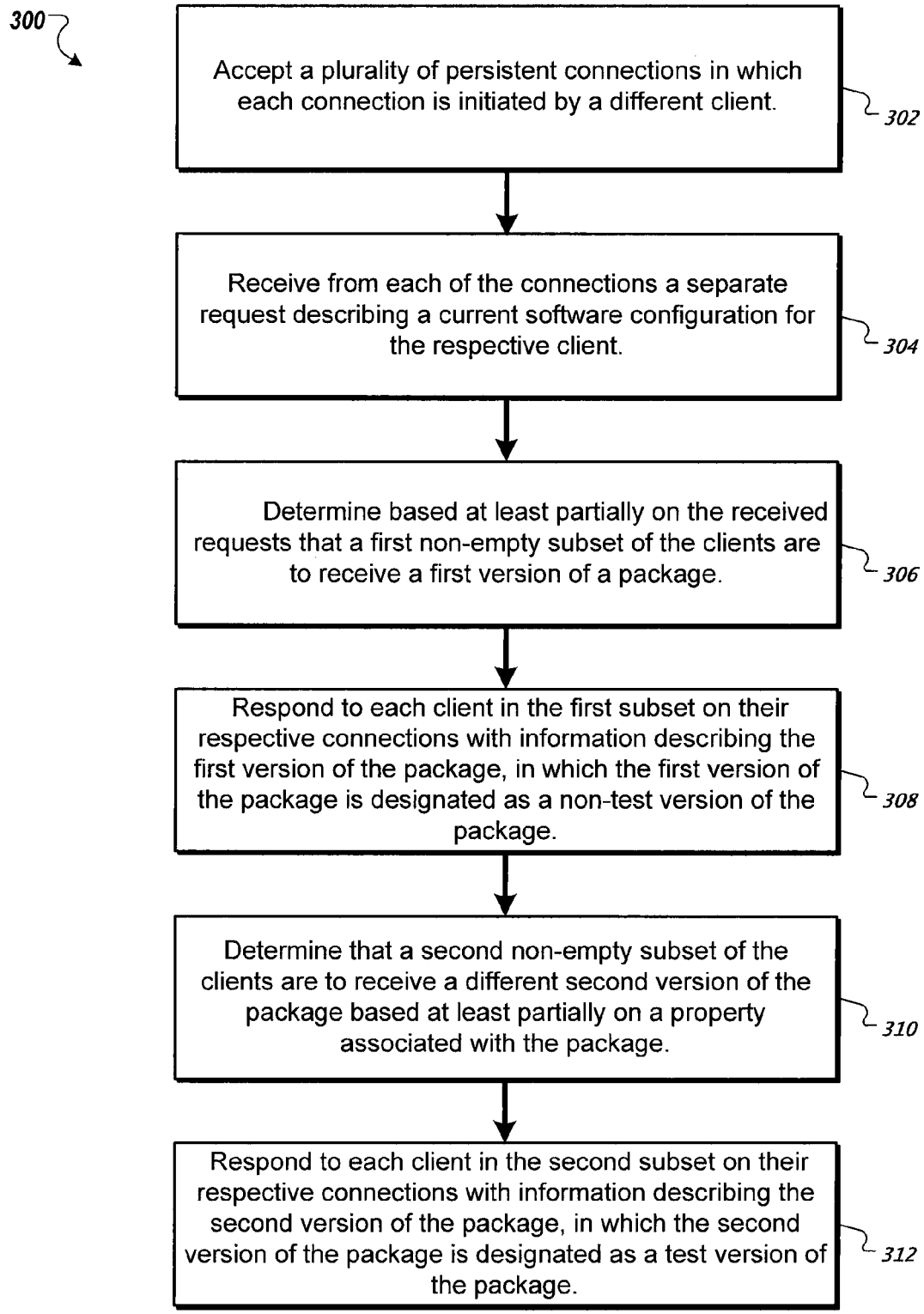
FIG. 3 is a flow chart illustrating an example technique for updating a package.

FIG. 3 is a flow chart illustrating an example technique 300 for updating a package. A plurality of persistent connections are accepted (e.g., by version server 102) in which each connection is initiated by a different client (e.g., clients 110a-h; block 302). A separate request is received from each of the persistent connections in which each request describes a current software configuration for the respective client (block 304). A first non-empty subset of clients are selected to a receive a first version of a package based at least partially on the received requests (block 306). See, for example, FIG. 1A and the accompanying discussion. For example, if a set of the client requests each identify an old version of package 'A', then a first subset of them will be selected to receive a new version of package 'A'. A response is sent to each client in the first subset with information describing the new version of the package (e.g., package 'A'), which is a non-test version of the package (block 308). A second non-empty subset of the clients are selected to receive a second version of the package based at least partially on a property associated with the package, such as the package's track (block 310). See, for example, FIG. 1B and the accompanying discussion. As described above, a system administrator can assign client configurations different tracks of the same package version or they can be assigned in an automated fashion. Information describing the second version of the package is then sent to each client in the second subset (block 312).

Figure 4:
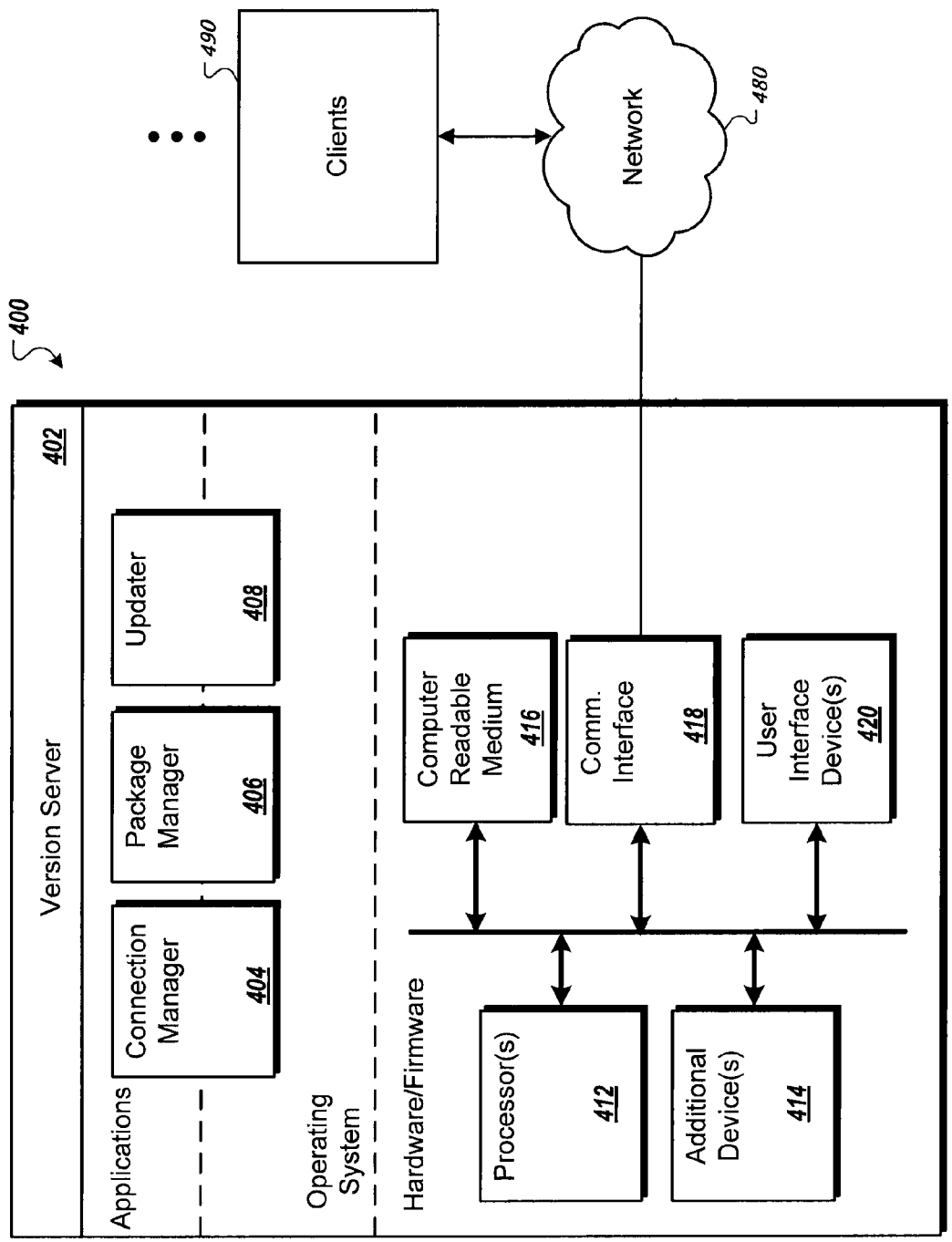
FIG. 4 is a schematic diagram of an example system for updating packages on clients.

FIG. 4 is a schematic diagram of an example system for updating packages on clients. The system 400 generally consists of a version server 402. The version server 402 is optionally connected to one or more user or client computers 490 through a network 480. The version server 402 consists of one or more data processing apparatuses. While only one data processing apparatus is shown in FIG. 4, multiple data processing apparatuses can be used in one or more locations. The version server 402 includes various modules, e.g. executable software programs, including a connection manager 404, a package manager 406 and an updater 408. The connection manager 404 is responsible for accepting persistent connections and requests from clients. The package manager 408 is responsible for determining which packages need to be installed or updated for a given client. The updater 408 provides package information to the clients over their persistent connections.

Each module runs as part of the operating system on the version server 402, runs as an application on the version server 402, or runs as part of the operating system and part of an application on the version server 402, for instance. Although several software modules are illustrated, there may be fewer or more software modules. Moreover, the software modules can be distributed on one or more data processing apparatuses connected by one or more networks or other suitable communication mediums.

The version server 402 also includes hardware or firmware devices including one or more processors 412, one or more additional devices 414, a computer readable medium 416, a communication interface 418, and one or more user interface devices 420. Each processor 412 is capable of processing instructions for execution within the version server 402. In some implementations, the processor 412 is a single or multi-threaded processor. Each processor 412 is capable of processing instructions stored on the computer readable medium 416 or on a storage device such as one of the additional devices 414. The version server 402 uses its communication interface 418 to communicate with one or more computers 490, for example, over a network 480. Examples of user interface devices 420 include a display, a camera, a speaker, a microphone, a tactile feedback device, a keyboard, and a mouse. The version server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accepting a plurality of persistent connections in which each connection is initiated by a different associated client;
   receiving from each of the connections a respective request that includes a respective software configuration for the client associated with the connection;
   determining a subset of clients associated with the connections to provide with a new version of a package based at least in part on a deployment profile associated with the new version of the package, the deployment profile including a deployment percentage indicating a percentage of the clients to receive the new version of the package;
   responding to each client in the subset of clients, using the connection associated with the client, with the new version of the package;
   receiving a set of results from the subset of clients provided with the new version of the package, the set of results indicating issues encountered by the subset of clients with the new version of the package;
   in response receiving the set of results from the subset of clients provided with the new version of the package, determining that additional clients not in the subset of clients are to be provided with the new version of the package based on the set of results received from the subset of clients; and
   in response to determining that the additional clients not in the subset of clients are to be provided with the new version of the package, providing the new version of the package to the additional clients.

2. The method of claim 1 wherein a particular connection is maintained if the new version of the package fails to install properly on the client associated with the particular connection.

3. The method of claim 1, further comprising:
   determining that a keep-alive message has not been received from a particular connection within a period of time; and
   responsive to the determining, dropping the particular connection.

4. The method of claim 1 wherein determining the subset of clients associated with the connections to provide with the new version of a package is further based on, at least, a time zone of the client, an operating system of the client, an architecture of the client, or a configuration of the client.

5. The method of claim 1 wherein responding to each client in the subset of clients further comprises sending validation data for the new version of the package to the client.

6. The method of claim 5 wherein the validation data includes a checksum of the new version of the package and one or more of: a nonce and a date.

7. The method of claim 5, further comprising signing the validation data before sending the validation data to the client.

8. The method of claim 1, wherein the deployment profile includes a deployment time zone indicating a time zone in which clients should receive the new version of the package.

9. The method of claim 1, further comprising providing a previous version of the package to the clients provided with the new version of the package upon determining not to provide the new version of the package to additional clients based on the set of results.

10. The method of claim 1, wherein the subset of clients is a first subset, the set of results is a first set of results, and the package is a first package, the method further comprising:
    determining a second subset of clients associated with the connections to provide with a new version of a second software package;
    responding to each client in the second subset of clients, using the connection associated with the client, with the new version of the second package;

receiving a second set of results from the second subset of clients provided with the new version of the second package, the set of results indicating issues encountered by the second subset of clients with the new version of the second package; and in response receiving the second set of results, determining that additional clients are not to be provided with the new version of the second package based on the second set of results.

11. A system comprising:

a computer readable storage medium including instructions stored thereon; and a plurality of clients each configured to maintain a persistent connection with a server that is coupled to the storage medium and operable to execute the instructions to perform the following operations:

accepting a plurality of persistent connections in which each connection is initiated by a different associated client;

receiving from each of the connections a respective request that includes a respective software configuration for the client associated with the connection;

determining a subset of clients associated with the connections to provide with a new version of a package based at least in part on a deployment profile associated with the new version of the package, the deployment profile including a deployment percentage indicating a percentage of the clients to receive the new version of the package;

responding to each client in the subset of clients, using the connection associated with the client, with the new version of the package;

receiving a set of results from the subset of clients provided with the new version of the package, the set of results indicating issues encountered by the subset of clients with the new version of the package;

in response receiving the set of results from the subset of clients provided with the new version of the package, determining that additional clients not in the subset of clients are to be provided with the new version of the package based on the set of results received from the subset of clients; and in response to determining that the additional clients not in the subset of clients are to be provided with the new version of the package, providing the new version of the package to the additional clients.

12. The system of claim 11 wherein a particular connection is maintained if the new version of the package fails to install properly on the client associated with the particular connection.

13. The system of claim 11, further comprising:

determining that a keep-alive message has not been received from a particular connection within a period of time; and responsive to the determining, dropping the particular connection.

14. The system of claim 11 wherein determining the subset of clients associated with the connections to provide with the new version of a package is further based on, at least, a time zone of the client, an operating system of the client, an architecture of the client, or a configuration of the client.

15. The system of claim 11 wherein responding to each of the clients further comprises sending validation data for the new version of the package to the client.

16. The system of claim 15 wherein the validation data includes a checksum of the new version of the package and one or more of: a nonce and a date.

17. The system of claim 15, further comprising signing the validation data before sending the validation data to the client.

18. A non-transitory computer readable storage medium encoded with a computer program, the program comprising instructions that when executed by data processing apparatus cause the data processing apparatus to perform operations comprising:

accepting a plurality of persistent connections in which each connection is initiated by a different associated client;

receiving from each of the connections a respective request that includes a respective software configuration for the client associated with the connection;

determining a subset of clients associated with the connections to provide with a new version of a package based at least in part on a deployment profile associated with the new version of the package, the deployment profile including a deployment percentage indicating a percentage of the clients to receive the new version of the package;

responding to each client in the subset of clients, using the connection associated with the client, with the new version of the package;

receiving a set of results from the subset of clients provided with the new version of the package, the set of results indicating issues encountered by the subset of clients with the new version of the package;

in response receiving the set of results from the subset of clients provided with the new version of the package, determining that additional clients not in the subset of clients are to be provided with the new version of the package based on the set of results received from the subset of clients; and in response to determining that the additional clients not in the subset of clients are to be provided with the new version of the package, providing the new version of the package to the additional clients.

19. The storage medium of claim 18 wherein a particular connection is maintained if the new version of the package fails to install properly on the client associated with the particular connection.

* * * * *